Aug. 14, 1956 J. E. PETRI ET AL 2,758,508
REAR VISION MIRRORS
Filed May 29, 1953 3 Sheets-Sheet 1
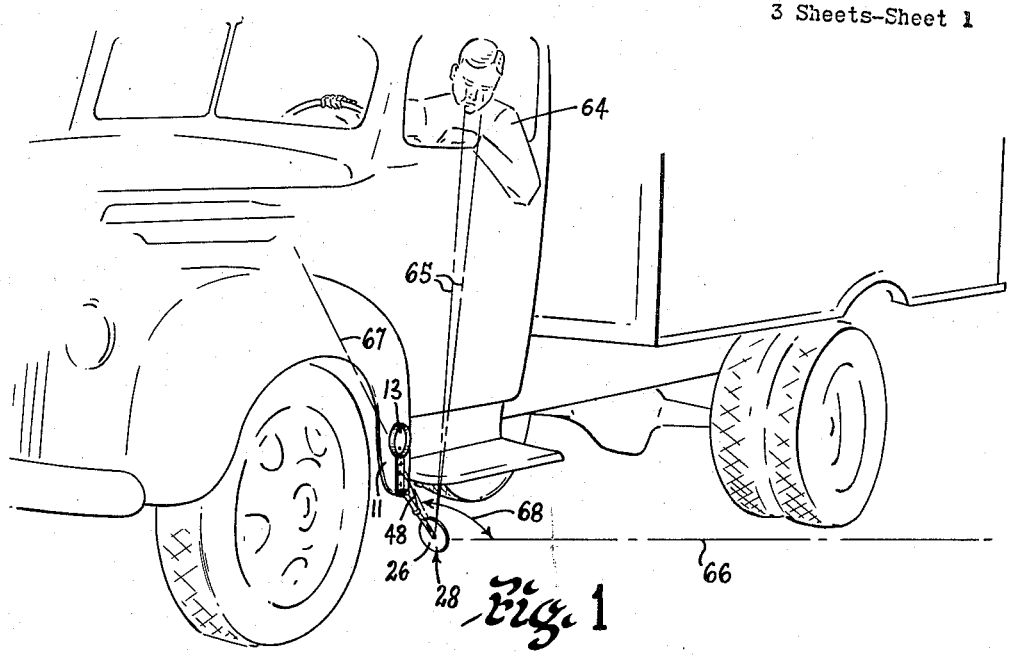
Fig. 1
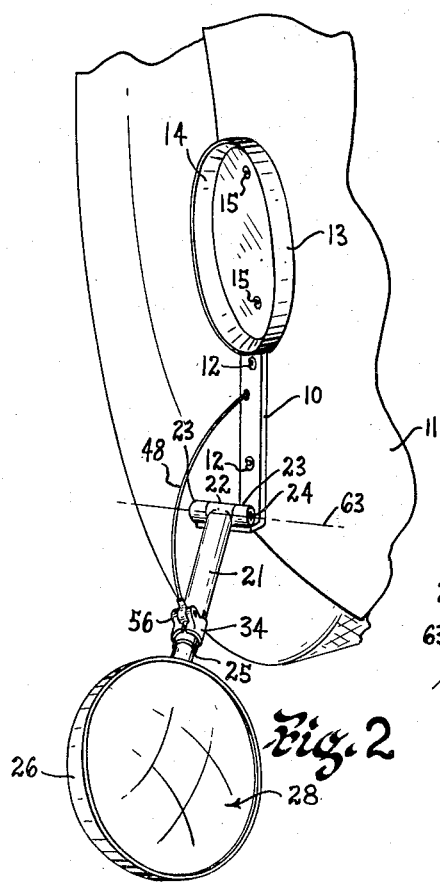
Fig. 2
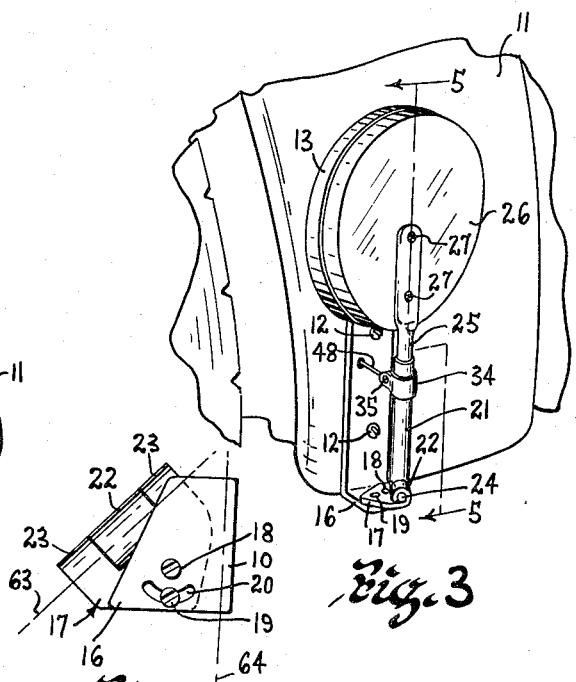
Fig. 6
Fig. 3
INVENTORS
JAN E. PETRI
BERNARD P. GAGNON
LOUIS L. GAGNON
BY
Louis L. Gagnon
ATTORNEY

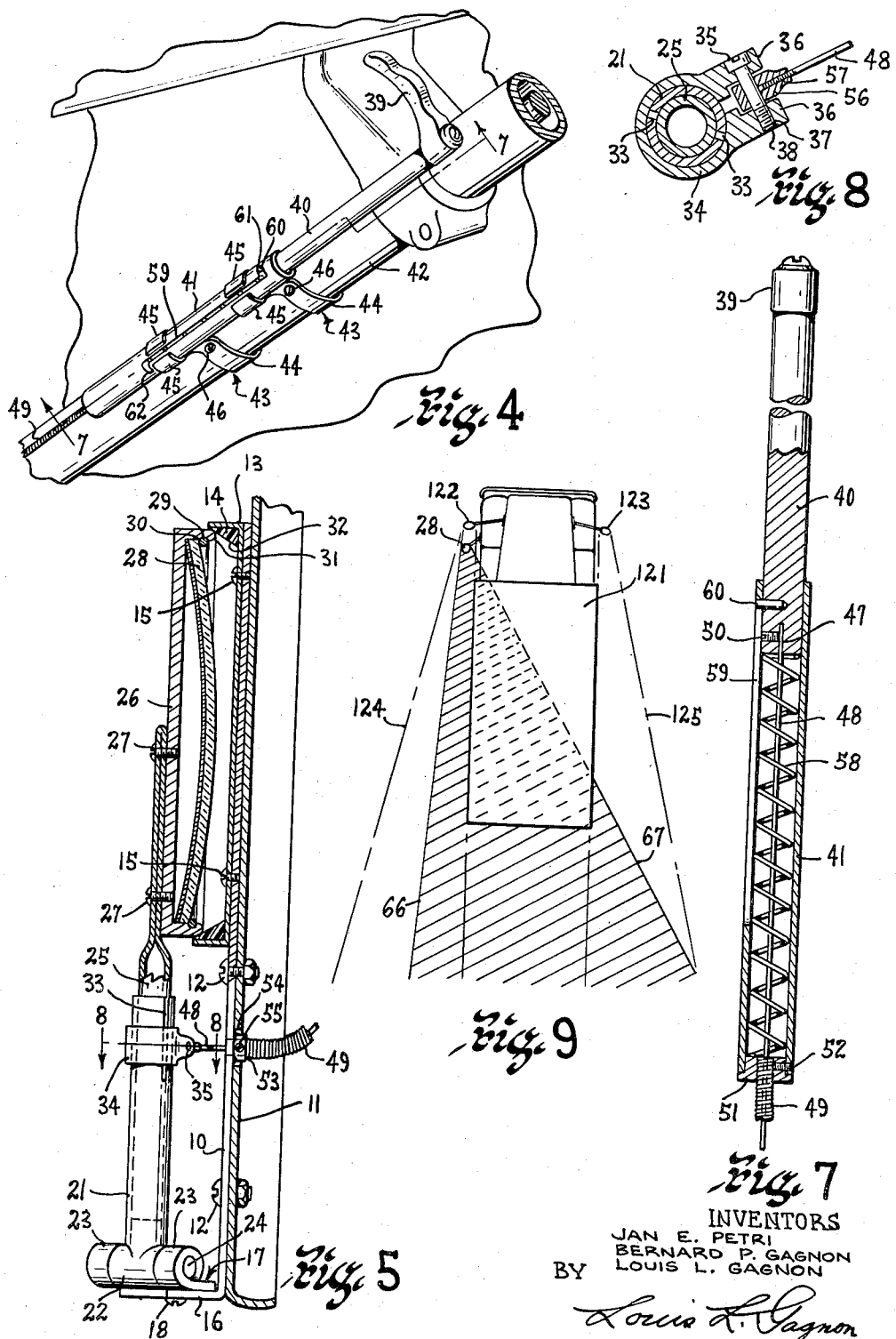

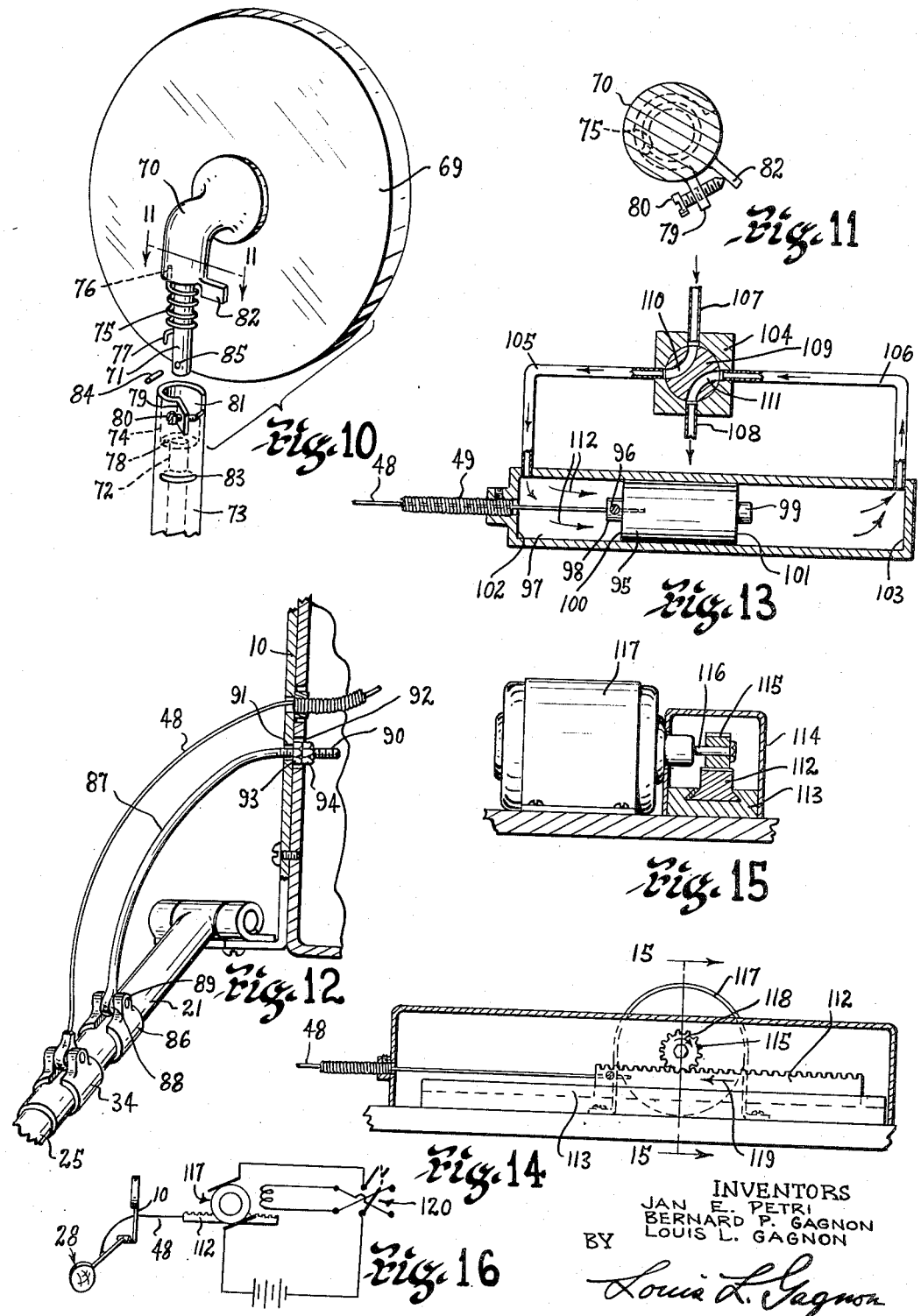

United States Patent Office 2,758,508
Patented Aug. 14, 1956

2,758,508
REAR VISION MIRRORS

Jan E. Petri, Pomfret, Conn., and Bernard P. Gagnon and Louis L. Gagnon, Southbridge, Mass., assignors to American Optical Company, Southbridge, Mass., a voluntary association of Massachusetts Application May 29, 1953, Serial No. 358,432

8 Claims. (Cl. 88—93)

This invention relates to rear vision mirrors for use with automotive vehicles and relates to the provision of a simple, efficient and novel construction of mirror designed particularly for use with vehicles of the straight truck type.

A principal object of the invention is to provide a rear view mirror for use with automotive vehicles of the straight truck type which will enable the driver to have clear unobstructed vision of the rear wheels of the truck and simultaneously vision of areas to the sides and to the rear of the truck.

Another object is to provide a rear vision device embodying a mirror which, when not in use, is encased within a protective housing positioned in close relation with the portion of the truck to which the device is attached and which mirror may be swung outwardly and downwardly by the operator to rear vision viewing position as, for example, when backing up the truck.

Another object is to provide a wide angle rear vision mirror adapted for use with relatively long or short straight type trucks and which is adjustable, according to conditions of use, to provide maximum field of vision.

Another object is to provide a rear vision mirror of the above character which will function with ease and maximum efficiency under all seasonal conditions.

Another object is to provide a device of the above character which may be moved to open or closed position by manually operable means which is readily accessible to the operator.

Another object is to provide automatically functioning means for moving the mirror to open position when the operator shifts the truck operating mechanism into reverse for backing up and for moving the mirror to closed position when the operator shifts the truck operating mechanism for forward movement of the truck.

Another object is to provide a rear vision device of the above character which may be moved to a position enabling the operator to view beneath and rearwardly of the vehicle with a relatively wide field of vision extending outwardly beyond the opposed sides of the truck.

Another object is to provide a protective housing for a rear mirror device of the above character which is so constructed as to be self-sealing to prevent water, dirt, dust, etc. from gaining access to the mirror and which affords maximum protection for the mirror and its associated parts against possible breakage when the device is not in use.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. We, therefore, do not wish to be limited to the exact details of construction and arrangement of parts shown and described as the preferred forms only are given by way of illustration.

Referring to the drawings:

Fig. 1 is a front perspective view of the device embodying the invention showing it adapted to an automotive vehicle and diagrammatically illustrating its use;

Fig. 2 is an enlarged perspective view of the device showing the mirror in open position;

Fig. 3 is an enlarged perspective view similar to that of Fig. 1 showing the mirror in closed position;

Fig. 4 is a fragmentary perspective view shown partially in section illustrating the mirror operating mechanism;

Fig. 5 is an enlarged sectional view taken as on line 5—5 of Fig. 3 and looking in the direction indicated by the arrows;

Fig. 6 is a bottom plan view of the lower end of the device;

Fig. 7 is an enlarged sectional view taken as on line 7—7 of Fig. 4 and looking in the direction indicated by the arrows;

Fig. 8 is an enlarged sectional view taken as on line 8—8 of Fig. 5 and looking in the direction of the arrows;

Fig. 9 is a plan view of an automotive vehicle of the type with which the device embodying the invention is adapted to be used and diagrammatically illustrating the field of vision which the said device affords to the operator of the vehicle;

Fig. 10 is a fragmentary exploded perspective view of a modified form of mirror adjustment mechanism;

Fig. 11 is an enlarged sectional view taken as on line 11—11 of Fig. 10 showing the adjustment parts in assembled relation with each other;

Fig. 12 is a fragmentary perspective view shown partially in section of a further modification of the invention;

Fig. 13 is a side elevational view shown partially in section of a modified form of mirror operating arrangement;

Fig. 14 is a view generally similar to Fig. 13 of a further modification of mirror operating arrangement;

Fig. 15 is a sectional view taken as on line 15—15 of Fig. 14 and looking in the direction indicated by the arrows; and Fig. 16 is a schematic view diagrammatically illustrating the system embodying the modification of Figs. 14 and 15.

The device embodying the invention is adapted to afford the operator of an automotive vehicle clear, unobstructed vision of the rear wheels of the vehicle and areas to each side and rearwardly of said rear wheels to enable the operator to determine whether or not anyone or any obstacle is rearwardly of the vehicle prior to backing up the vehicle.

An investigation of accidents occurring throughout the country reveals that, in the case of oil delivery or similar trucks, approximately 26% of the total accidents involving such trucks were backing up accidents and of the total accidents involving trucks of the type employed by the meat packing industry, approximately 90% of the total accidents were backing up accidents and were due to the fact that the operator had no means of determining whether or not any individual or obstacle was rearwardly of the vehicle at the time of said backing up.

It, therefore, is one of the primary objects of this invention to provide a device whereby vision of this nature is possible to the operator with a view to reducing the number of such accidents and to assist the operator in properly manipulating the vehicle during said backing up.

It is a further object of the invention to provide a viewing device of this character which has its mirror portion retractable to a location adjacent the sides of the vehicle whereby the said mirror will not be exposed for possible accidental engagement and injury during the normal operation of the vehicle and which, when in retracted position, has a self-sealing housing for protecting the mirror against water, dirt, dust, etc. which might otherwise gain access thereto.

A further object is to provide a device of this character which may be readily manipulated by the operator when seated in driving position in the vehicle or which will operate automatically when the operator manipulates the conventional transmission mechanism of the vehicle.

Referring more particularly to the drawings wherein like characters of reference designate like parts throughout the several views, the device embodying the invention comprises a main support 10 adapted to be secured to the mudguard 11 of an automotive vehicle as by screws, bolts or the like 12. The main support 10 has, on its upper end, a shallow cup-like housing portion 13 provided inwardly with an annular angled seat 14 of rubber, plastic or other suitable self-sealing material. The shallow housing 13 is secured to the main support 10 by screws or other suitable means 15. The lower end of the main support 10 is provided with a forwardly angled portion 16 which, as shown in Fig. 6, has a hinge portion 17 secured thereto by a screw, bolt or the like 18 which extends through aligned openings in the hinge portion 17 and in the angled portion 16. The hinge portion 17 is further secured to the angled portion 16 by a screw 19 which extends through an arcuate slot 20 formed in said angled portion 16 and with its center substantially concentric with the opening through which the screw, bolt or the like 18 extends. A tubular member 21 having a hinge portion 22 adapted to fit in between the hinge ears 23 of the hinge member 17 is pivotally connected to said hinge ears by a hinge pintle 24. The tubular member 21 is adapted to telescopingly receive a support 25 to which a shallow cup-like housing section 26 is attached by screws, bolts or the like 27 and in which is secured a convexly curved mirror 28. The mirror is secured in said shallow housing 26 by a split annular resilient connection ring 29 which is adapted to be sprung into a curved circumferential groove 30 formed internally of the housing 26. The housing 26 is provided with a curved annular seating edge 31 which is adapted to engage the bevelled face 32 of the sealing ring 14, see Fig. 5.

The tubular member 21 is provided with a plurality of longitudinally disposed slots 33 adjacent the upper end thereof and has a split sleeve 34 on said end adapted to be adjusted in clamping engagement therewith. The tubular member 21, in turn, is adapted to force said end into binding relation with the support 25 to lock said support 25 in fixed adjusted relation with said tubular member, see Figs. 5 and 8. The clamping action is introduced by a screw, bolt or the like 35 which extends through perforations in wings 36 carried by the clamp sleeve 34. The bolt or screw extends through the perforation in one wing and is threadedly connected to the other of said wings by forming the perforation therein with a threaded bore 37 to receive the threaded end 38 of the bolt or screw 35.

To move said mirror and its associated supporting mechanism outwardly and downwardly about the hinge pintle 24, there is provided a hand-grip member 39. The said member 39 is secured to a rod 40 mounted within a tubular bearing 41 attached to the steering post 42 of the vehicle as illustrated in Fig. 4. The tubular bearing 41 is secured to the steering post 42 by clamp members 43 having annular sections 44 surrounding the post 42 and annular sections 45 surrounding the tubular bearing 41. The clamping action is introduced by wing screws or the like 46 located intermediate said steering post 42 and the tubular bearing 41. It is to be understood that other suitable means may be provided for attaching the tubular bearing to the steering post 42, if desired. The rod 40 has one end 47 of the wire core 48 of a flexible cable 49 secured thereto as by a set screw 50 or other suitable means. The flexible cable 49 has it adjacent end secured to a cap 51 in the lower end of the tubular bearing 41 as by a set screw or other suitable means 52. It is to be understood that the flexible cable portion may be secured in said cap as by soldering or the like and that the end 47 of the wire core 48 may be secured to the lower end of the rod 40 as by soldering or the like. The opposed end of the flexible cable 49 is secured in a hollow boss 53 formed on the support 10 and which extends through an opening 54 formed in the mudguard, see Fig. 5. It is held in secured position as by a set screw 55 or by soldering or other suitable means. The flexible wire core 48 extends through the outer flexible cable portion 49 an outwardly of the hollow boss 53 and is secured, as shown in Fig. 8 to a connection portion 56 attached to the screw 35. The said end may be attached to the connection member 56 as by threading, soldering or other suitable means as illustrated at 57 in Fig. 8. Internally of the housing 41 and between the cap 51 and the lower end of the rod 40, there is positioned a coil spring 58. The tubular bearing 41 is provided with a longitudinal slot 59 which is adapted to receive a stop pin 60 which extends outwardly of one side of the rod 40, see Fig. 7. The longitudinal slot 59, as shown in Fig. 4, is provided with offset substantially right-angular slotted portions 61 and 62 in which the pin 60 may be rotated to lock the rod either in its most upward or downward position with respect to the tubular bearing 41. When it is desired to move the mirror outwardly and downwardly, as shown in Figs. 1 and 2, all that is necessary is for the operator to grasp the handle 39 giving it a slight turn of an amount sufficient to move the pin 60 into alignment with the longitudinal slot 59 whereupon pressure is simultaneously exerted upon the rod 40 against the action of the coil spring 58 to move the pin downwardly of the longitudinal slot 59 an amount sufficient to enable it to be turned sidewise into locking engagement with the angularly disposed slotted portion 62. This simultaneously causes the wire core 48 which is attached at 47 to the lower end of the rod 40 and at its opposed end to the connection means 56 carried by the mirror supporting portion of the device to move said mirror and its associated housing section outwardly with respect to the housing section 13 and downwardly to its proper position of use. It is particularly pointed out that the axis of the hinge, as illustrated by the dot and dash lines 63 in Figs. 2 and 6, is so angled with respect to the plane 64 of the main support 10 as to cause said mirror to tilt to the proper angle which will enable the operator, sighting downwardly as illustrated by the dash lines 65 in Fig. 1, to have a wide angle of rear vision as defined by the dot and dash lines 66 and 67. The angle of vision is defined by said lines and is designated by the arrows 68. See also Fig. 9 wherein a plan view of an automotive vehicle of the type with which the device embodying the invention is to be used is diagrammatically illustrated at 121. The angle of vision is diagrammatically illustrated by the hatched area between the outer lines of vision 66 and 67. By referring to Fig. 1 and Fig. 9, it is pointed out that the operator is able to not only have clear vision of the rear wheels of the vehicle but also has vision to the opposed sides thereof and rearwardly thereof and with the aid of the conventional side mirrors 122 and 123 which afford a further field of rear side vision, as illustrated by the dash lines 124 and 125, the operator should have no difficulty in determining whether or not there is anything of the nature of an obstacle, animal, person or child in the rear of the vehicle at the time he desires to back up. With the aid of the rear vision mirror of the device embodying the invention, it is also possible for the operator to determine the position of his vehicle with respect to a loading platform or other particular location with reference to which he desired to back.

It is pointed out that the mirror 28 is formed convex, as shown in Fig. 5, to increase the possible angle of vision with said mirror. This, in the present instance, need only be a slight amount, say a curve of approximately 1¼ diopters. Subsequent to using the mirror when packing up the vehicle, all that is required is that the operator again turn the hand grip 39 in the opposite direction a slight amount sufficient to disengage the pin 60 from the angled slot 62 whereupon the spring 58 will automatically force the mirror and its associated housing upwardly into seated sealed relation with the housing section 13. This removes the mirror from a location where it might otherwise be accidentally engaged and become injured or broken during the normal use of the vehicle and the self-sealing action of the housing section 26 of the mirror with the housing section 13 as brought about by the rounded edge 31 and angled sealing ring 14 positively seals the mirror against water, dirt, dust, etc. gaining access thereto when not in use. This enables the device to be used throughout all seasons of the year and further forms a protective housing for the mirror to prevent its being accidentally engaged and broken. The mirror housing is locked in permanent sealed relation with the sealing ring 14 by moving the pin 60 into the angled slot 61 adjacent the upper end of the tubular bearing 41.

It is further pointed out that the angle of the mirror may be varied as desired when the device is initially being placed in position of use on the automotive vehicle or truck. This is made possible by loosening the screws 18 and 19 and varying the angle of the axis 63 of the hinged pintle with respect to the plane 64 of the main support 10 and further by loosening the screw 35 to enable the support 25 to be rotated in the tubular member 21. This varying of the angle is possible while still retaining the proper seating relation of the mirror housing section 26 with the seal ring in the housing section 13. When properly adjusted to obtain the desired field and angle of rear vision as diagrammatically illustrated in Fig. 9, the screws 18, 19, and 35 are again tightened to retain the mirror in adjusted position.

While the interfitting housing sections 13 and 26, as brought about by the annular edge 31 and resilient annular seating ring 14, provides a seal for preventing water, dirt, dust, etc., from gaining access to the mirror during the use of the device, the engagement brought about by the annular edge 31 which is effectively a line engagement with the angled sealing ring 14, greatly reduces the area of contact and the possibility of the outer housing 26 freezing to the inner housing 13. The fact that the inner housing 13 slightly overlaps the outer housing 26, further insures against possible failure of operation of the device.

In Fig. 10, there is shown a slight modification of mirror support wherein the mirror housing 69 is provided with a portion 70 having a stem 71 adapted to be pivotally supported in the hollow bore 72 of a main support 73. The support 73 has a lower pivotal connection similar to the tubular member 21 with the hinge plate 17. The support 73 has an upper end area 72 of a larger diameter than the bore 72 for receiving a coil spring 75. The coil spring 75 has its upper end 76 anchored in the portion 70 and has a lower depending portion 77 adapted to fit within an opening 78 located adjacent the bore 72. The upper end of the support 73 is provided with an outwardly extending lip portion 79 having an adjustable stop screw 80 threadedly connected therewith and has a cut-out side area. This cut-out area is adapted to receive a depending lip 82 formed on said portion 70. The coil spring is so formed that when the parts are assembled with each other, the said spring will constantly urge the lip 82 towards the lip 79 and against the end of the stop screw 80. This arrangement leaves the mirror support 69 free to move against the action of the spring in a direction away from the lip 79. The screw 80 provides means for varying the angle of the mirror carried by the support 69 whereby the best possible vision may be afforded the driver of the vehicle when viewing, as diagrammatically illustrated in Fig. 1.

The above arrangement provides means whereby the mirror housing section 69 will be self-yielding to enable it to automatically intimately fit with the angled sealing ring 14. The tension of the spring 75 is such as to enable the said housing section 69 to be self-seating with said ring 14 and thereby insures a more positive seal of said housing section with the housing section 13. The housing 69 is otherwise similar to the housing 26.

To retain the stem 71 in the bore 72, the support 73 is provided with a transversely disposed slot 83 in the side wall thereof and in communicating relation with the bore 72. The slot 83 is adapted to have a stop pin 84 extended therethrough and within an opening 85 in the end of the stem 71. The pin 84, therefore, holds the stem 71 from pulling out of the bore 72. The slot 83, however, is such as to enable the stem 71 to have the desired range of rotary movement whereby the full range of adjustment, as brought about by the screw 80, is possible and the free floating and self-seating characteristics of the mirror housing 69 with the other section of the housing is insured.

In Fig. 12, the support 21 to which the mirror 26 is attached, as previously described in connection with Figs. 1 through 5, is provided with a clamp sleeve 86 having a stop bar 87 loosely connected thereto, as shown at 88. The stop bar 87 has a perforated end through which the clamp screw 89 of the clamp sleeve 86 is extended. The bar 87 has a threaded end portion 90 which extends through an opening 91 in the support 10 and through an aligned opening 92 formed in the mudguard. The threaded end 90 is provided with a pair of lock nuts 93 and 94 which are adapted to engage the support 10 when the mirror is swung outwardly and downwardly and provide means for limiting said outward and downward movement and for controlling the extent thereof. This control is brought about by threading the nuts 93 and 94 rearwardly or forwardly on the threaded end 90. The stop bar 87 is curved so as to enable it to slide inwardly of the openings 91 and 92 when the mirror and its associated supporting portions are moved to raised position. This movement is brought about by the proper manipulation of the handgrip portion 39 under the control of the operator. The stop bar is adapted to relieve the wire and its connections with the sleeve 34 and with the rod 40 from possible shock and strain which might pull said connections loose and provides more positive means for retaining the mirror and its associated parts in proper outward and downward position.

In Fig. 13, there is shown a modified form of mirror adjustment means. In this instance, the wire core 48 of the flexible cable 49 is attached to a piston 95 by a set screw or other suitable means 96. The piston 95 is slidably supported within a sealed housing 97 and has extensions 98 and 99 on the opposed sides thereof for spacing the opposed ends 100 and 101 of said piston from the end walls 102 and 103 of the sealed housing 97. The valve 104 is connected with the opposed ends of the sealed housing 97 by pipe lines 105 and 106. The said valve is further connected with an inlet 107 and an outlet 108. The valve 104 further has an inner rotatable member 109 provided with spaced curved channels 110 and 111 which may be rotated to one position whereby fluid such as air, oil, or other means under pressure may be directed through the inlet 107, passageway 110, and through the pipe line 105 into the housing whereby the fluid pressure, as indicated by the arrows 112, will force the piston 95 in the direction of the arrows 112 toward the opposite end of the housing. This movement will pull the wire 48 and thereby raise the mirror and its supporting portions to closed position. During this movement, the passageway 111 which connects the pipe line 106 with the outlet 108 permits the air or other fluid to bleed outwardly of the housing as the piston 95 is moved as above described. When it is desired to force the piston 95 in the opposite direction, the passageway 110 is moved into alignment with the pipe line 106 and inlet 107 whereby the fluid will be forced under pressure into the housing through said pipe line 106 and will force the piston in the opposite direction. This will move the mirror outwardly and downwardly to viewing position. The valve may be manually controlled by the operator or may be connected with the transmission shift lever mechanism so as to function automatically as the shift lever is operated, that is, the valve may be so connected that when the shift lever is moved to reverse position for backing up the vehicle, the valve will align passageway 107 with the pipe line 106 to force piston 95 in the direction for pushing on the wire 48 whereby the mirror will automatically move outwardly and downwardly to viewing position. When the shift lever is thereafter moved for forward driving of the vehicle, the valve will automatically turn to align the passageway 110 with the inlet 107 and the pipe line 105 and simultaneously move passageway 111 in alignment with the pipe line 106 and the outlet 108. This causes the piston 95 to move in the opposite direction and introduces a pulling action on the wire 48 whereby the mirror will be lifted to closed position.

In Figs. 14, 15 and 16, there is shown a further modification of mirror operating apparatus. In these figures, the mirror operating wire 48 is connected with a rack 112 slidably mounted in a slideway 113 internally of a casing 114. A pinion 115 mounted on the rotor shaft 116 of a reversible motor 117 meshes with the rack 112 so that when the motor is energized and caused to rotate in a clockwise direction, as indicated by the arrow 118, the rack 112 will be moved in the direction of the arrow 119 and will thereby apply a pushing action on the wire 48 and cause the mirror 28 to be swung outwardly and downwardly with respect to the main support 10, as diagrammatically illustrated in Fig. 16. When the motor is energized to cause the rotor to move in the opposite direction, the rack 112 will be drawn inwardly in a direction opposite the direction indicated by the arrow 119 and will exert a pulling action on the wire 48 and cause the mirror 28 to be raised to closed position. This reverse action is brought about by a two-way switch diagrammatically illustrated at 120 in Fig. 16. This switch 120 may be manually operated by the operator of the vehicle or may be connected with the drive shift mechanism of the vehicle so as to function automatically, that is, the switch 120, for example, when the shift lever is moved to reverse position for backing up the vehicle, will close a circuit through the motor which will cause said motor to rotate in a clockwise direction and, in turn, cause the rack 112 to push the wire 48 outwardly and thereby move the mirror outwardly and downwardly to viewing position. When the shift lever is moved to a position for forward driving, the switch 120 will be automatically operated to close a circuit through the motor to cause it to rotate in an anti-clockwise direction whereby the mirror will be automatically raised and moved to closed position.

The valve 104 and switch 120 may be attached to the steering post of the vehicle in proper associated relation with the shift lever or some suitable part of the shifting mechanism whereby the proper function of the valve or switch will take place as described above.

In all instances, the construction of the mirror and its supporting parts and the general function thereof will be similar to that described in connection with the mirror construction of Figs. 1 through 6 either with or without the inclusion of the constructions illustrated and described in connection with Figs. 10 and 14.

From the foregoing description, it will be seen that simple, efficient and economical means have been provided for accomplishing all of the objects and advantages of the invention.

Having described our invention, we claim:

1. A rear view mirror device for use with a vehicle comprising a support for attachment with the vehicle, a housing portion on said support, a mirror housing portion adjustably connected with said support for movement into and out of closed relation with said first housing portion, a mirror in said mirror housing portion being adapted to assume a position internally of said housing portions when in closed relation with each other and being adapted to be located at a given open position relative to said first housing portion when said housing portions are moved outwardly relative to each other and means for bringing about said movements of said mirror and housing portion.

2. A device for use with vehicles comprising a support for attachment to the vehicle, a shallow cuplike housing section carried by said support, a shallow cuplike housing section having a mirror supported therein and being shaped to intimately fit with the housing section carried by the support to seal the mirror therein, means for pivotally connecting said mirror housing section to said support with said means being such that when the mirror support is moved outwardly relative to the shallow housing section carried by the support the plane of the mirror will be angled a controlled amount relative to the plane of said housing section on said support and further being such that when the mirror housing section is moved into fitting relation with the housing section carried by the support, the mirror will assume a position in a plane substantially parallel with the plane of the housing section on said support, and means for bringing about a relatively intimate seal of said housing sections when in said fitted relation with each other.

3. A rear vision viewing device for use with vehicles such as delivery trucks and the like comprising a support for attachment to the mudguard of a vehicle on the driver's side thereof, said support having an outwardly extending hinge bearing portion adjacent its lower end, an arm, and means providing a pivotal connection of said arm to said outwardly extending hinge bearing portion for movement about an axis acutely angled to the plane in which said support is to be mounted on the mudguard, a mirror carried by said arm, the general plane of said mirror being acutely angled with respect to said axis about which the arm pivots, and a housing on said support above said pivotal connection a distance equal to the length of the said arm, said housing being of a size and shape to receive said mirror, and the angular displacement of said pivotal connection to the plane of the support and to the plane of the mirror being such that when the mirror is in vertical position it will fit within said housing and when pivoted to below the lower extent of said mudguard will reflect an image of the area visible between the two rear wheels of the vehicle in an upward direction so that the driver of the vehicle may by looking downwardly into the mirror see said image, and means for moving said arm to pivot the mirror from said position of use to closed position within the housing.

4. A rear vision viewing device for use with vehicles such as delivery trucks and the like comprising a support having means for attachment to the mudguard of a vehicle on the driver's side thereof, said support having an outwardly extending hinge bearing portion adjacent its lower end, an arm and means providing a pivotal connection of said arm to said outwardly extending hinge bearing portion for movement about an axis acutely angled to the plane in which said support is to be mounted on the mudguard, a mirror carried by said arm, the general plane of said mirror being acutely angled to said axis about which the arm pivots, and a housing on said support above said pivotal connection a distance equal to the length of said arm, said housing being of a size and shape to receive said mirror, means for adjusting the angular displacement of said pivotal connection relative to the plane of the support and relative to the plane of the mirror so that when the mirror is in vertical position it will fit within said housing and when positioned to below the lower extent of said mudguard it will reflect an image of the area visible between the two rear wheels of the vehicle in an upward direction to permit the driver of the vehicle by looking downwardly into the mirror to see said image, and means for moving said arm to pivot the mirror from said position of use to closed position within the housing.

5. A rear vision viewing device for use with vehicles such as delivery trucks and the like comprising a support having means for attachment to the mudguard of a vehicle on the driver's side thereof, said support having an outwardly extending hinge bearing portion adjacent its lower end, an arm, means providing a pivotal connection of said arm to said outwardly extending hinge bearing portion, a mirror adjustably mounted on said arm permitting the general plane of said mirror to be acutely angled to said axis about which the arm pivots, a housing on said support above said pivotal connection a distance equal to the length of the said arm, said housing being of a size and shape to receive said mirror, and means for adjusting said pivotal connection relative to the support so that the mirror when properly adjusted on said arm will when swung into a vertical position fit within said housing and when swung to a position below the lower extent of said mudguard will reflect an image of the area visible between the two rear wheels of the vehicle in an upward direction to permit the driver of the vehicle, by looking downwardly into the mirror, to see said image, and means for moving said arm to pivot the mirror from said position of use to closed position within the housing.

6. A rear vision mirror for use with vehicles such as delivery trucks and the like, comprising a support for attachment to the mudguard of a vehicle on the driver's side thereof, an arm, and means providing a pivotal connection of said arm to said support, a mirror mounted on said arm with its general plane in a direction paralleling the longitudinal axis of said arm, and a housing on said support above said pivotal connection a distance equal to the spacing of said mirror from its pivotal connection, said housing being of a size and shape to receive said mirror and said mirror being pivotal about the axis of said arm to permit the mirror when swung to vertical position to seat itself within said housing, spring means urging said mirror to a pivoted position on said arm where its general plane will be angled to the axis about which said arm swings sufficiently to permit the mirror when positioned to below the lower extent of said mudguard to reflect an image of the area visible between the two rear wheels of the vehicle in an upward direction so that the driver of the vehicle by looking downwardly into the mirror may see said image, and means for moving said arm to swing the mirror from said position of use to closed position within the housing.

7. A rear vision mirror for use with vehicles such as delivery trucks and the like, comprising a support for attachment to the mudguard of a vehicle on the driver's side thereof, an arm and means providing a pivotal connection of said arm to said support, a mirror mounted on said arm, and a housing on said support above said pivotal connection a distance equal to the spacing of said mirror from its pivotal connection, said housing being of a size and shape to receive said mirror, and said mirror being mounted on said arm to seat itself within said housing when swung to vertical position and to reflect an image of the area visible between the two rear wheels of the vehicle in an upward direction when swung to below the lower extent of said mudguard so that the driver of the vehicle by looking downwardly into the mirror may see said image, an adjustable control member to be positioned within the cab of said vehicle, and a flexible member connecting said control member to the arm supporting the mirror, said control member in one position of adjustment causing the mirror to swing into closed position within the housing and in the other position of adjustment causing the mirror to be swung into position of use.

8. A rear view mirror device of the character described for use with a vehicle having drive shift mechanism for selective adjustment for forward or rearward movement of the vehicle as desired, said device comprising a mirror support for attachment to the driver's side of the vehicle, a mirror pivotally mounted on said support for movement to an inoperative position with the plane of the mirror lying adjacent to and substantially in the plane of said driver's side of the vehicle and for movement outwardly to an operative position with the plane of the mirror angled relative to the plane of the driver's side of the vehicle and so disposed as to enable rear viewing therein by the driver and automatically functioning means for operatively connecting said pivotally mounted mirror with the drive shift mechanism of the vehicle whereby said mirror will be automatically moved to inoperative position adjacent the side of the vehicle when the drive shift mechanism is adjusted for forward movement of the vehicle and said mirror will be automatically moved outwardly and angled to operative position when the drive shift mechanism is adjusted for movement of the vehicle in a rearward direction.

References Cited in the file of this patent

UNITED STATES PATENTS

| Number | Name | Date |
|---|---|---|
| 564,454 | Ryan | July 21, 1896 |
| 730,361 | Fyfe | June 9, 1903 |
| 795,602 | Fyfe | July 25, 1905 |
| 1,314,289 | Williams | Aug. 26, 1919 |
| 1,576,793 | Sadler | Mar. 16, 1926 |
| 2,353,380 | Adler | July 11, 1944 |